United States Patent
Yamazaki et al.

(10) Patent No.: US 11,745,785 B2
(45) Date of Patent: Sep. 5, 2023

(54) VEHICLE CONTROL SYSTEM

(71) Applicant: HONDA MOTOR CO., LTD., Tokyo (JP)

(72) Inventors: Ryo Yamazaki, Saitama (JP); Yosuke Shimizu, Saitama (JP); Takeyuki Suzuki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 212 days.

(21) Appl. No.: 17/019,993

(22) Filed: Sep. 14, 2020

(65) Prior Publication Data

US 2021/0078625 A1 Mar. 18, 2021

(30) Foreign Application Priority Data

Sep. 17, 2019 (JP) .................................. 2019-168719

(51) Int. Cl.
| | |
|---|---|
| *B62D 1/10* | (2006.01) |
| *B62D 15/02* | (2006.01) |
| *B62D 1/183* | (2006.01) |
| *B60W 10/20* | (2006.01) |

(52) U.S. Cl.
CPC ............ *B62D 1/10* (2013.01); *B60W 10/20* (2013.01); *B62D 1/183* (2013.01); *B62D 15/025* (2013.01)

(58) Field of Classification Search
CPC ........ B62D 1/10; B62D 1/183; B62D 15/025; B62D 1/02; B62D 1/046; B62D 1/18; B62D 1/22; B60W 10/20
USPC .......................................................... 701/41
See application file for complete search history.

(56) References Cited

U.S. PATENT DOCUMENTS

| | | | | |
|---|---|---|---|---|
| 2007/0233343 A1* | 10/2007 | Saito | .................... | B62D 15/025 701/41 |
| 2010/0030430 A1* | 2/2010 | Hayakawa | .......... | B60T 8/17557 701/1 |
| 2012/0271500 A1* | 10/2012 | Tsimhoni | ................. | B62D 1/28 701/23 |
| 2013/0226406 A1* | 8/2013 | Ueda | ...................... | B62D 6/001 701/41 |

(Continued)

FOREIGN PATENT DOCUMENTS

| | | |
|---|---|---|
| DE | 102017219440 A1 | 5/2019 |
| JP | 2009230627 A * | 10/2009 |

(Continued)

OTHER PUBLICATIONS

Notice of Reasons for Refusal for Patent Application JP 2019-168719 dated May 31, 2022; 6 pp.

*Primary Examiner* — Jonathan M Dager
*Assistant Examiner* — Jean W Charleston
(74) *Attorney, Agent, or Firm* — Armstrong Teasdale LLP

(57) ABSTRACT

A vehicle control system is used for a vehicle in which steering control is executable. The vehicle control system includes an operation element configured to receive a driving operation by an occupant; a contact sensor configured to detect a contact operation on the operation element from either a first side or a second side in a vehicle width direction; and a travel control unit configured to change a travel position of the vehicle in the vehicle width direction within a travel path where the vehicle is traveling if the contact sensor detects the contact operation in a state where the steering control is executable.

9 Claims, 8 Drawing Sheets

(56) References Cited

U.S. PATENT DOCUMENTS

| | | | |
|---|---|---|---|
| 2014/0229068 A1* | 8/2014 | Ueyama | B60W 10/20 |
| | | | 701/41 |
| 2015/0324111 A1* | 11/2015 | Jubner | B62D 1/04 |
| | | | 715/771 |
| 2016/0194003 A1* | 7/2016 | Torii | B60W 30/16 |
| | | | 701/23 |
| 2020/0094825 A1* | 3/2020 | Kato | G06V 20/58 |
| 2020/0198634 A1 | 6/2020 | Yashiro | |
| 2020/0209007 A1* | 7/2020 | Sasaki | G01C 21/36 |
| 2020/0298877 A1* | 9/2020 | Takamatsu | G01C 21/3492 |
| 2020/0317196 A1* | 10/2020 | Yoshida | B60W 60/0016 |
| 2020/0317219 A1* | 10/2020 | Yoshida | B62D 15/0255 |
| 2020/0377117 A1* | 12/2020 | Nojiri | B60W 60/001 |
| 2020/0398868 A1* | 12/2020 | Horii | B60W 60/0053 |
| 2021/0078492 A1* | 3/2021 | Narumi | B60W 50/14 |

FOREIGN PATENT DOCUMENTS

| | | | |
|---|---|---|---|
| JP | 2009230627 A | | 10/2009 |
| JP | 2015057688 A | * | 3/2015 |
| JP | 2015057688 A | | 3/2015 |
| JP | 2016203864 A | | 12/2016 |
| WO | 2019058465 A1 | | 3/2019 |

* cited by examiner

VEHICLE CONTROL SYSTEM

TECHNICAL FIELD

The present invention relates to a vehicle control system.

BACKGROUND ART

A vehicle control system known in the art can change a travel position of a vehicle in a vehicle width direction as an occupant performs an operation on a screen of a display (for example, WO 2019/058465A).

In the above conventional technique, the occupant needs to perform a complicated operation on the screen of the display in order to change the travel position of the vehicle in the vehicle width direction, and thus the occupant is required to approach the display adequately. Accordingly, it is difficult to change the travel position of the vehicle in the vehicle width direction when the occupant is away from the display.

Further, in the above conventional technique, the occupant is required to set the travel position of the vehicle in the vehicle width direction in advance. Accordingly, it is difficult to change the travel position of the vehicle in the vehicle width direction when the vehicle is traveling.

SUMMARY OF THE INVENTION

In view of such a problem of the prior art, a primary object of the present invention is to provide a vehicle control system that can easily change the travel position of the vehicle in the vehicle width direction even when the occupant is away from the operation element or even when the vehicle is traveling.

To achieve such an object, one embodiment of the present invention provides a vehicle control system (1) for a vehicle (2) in which steering control is executable, including: an operation element (10) configured to receive a driving operation by an occupant (X); a contact sensor (35 to 37) configured to detect a contact operation on the operation element from either a first side or a second side in a vehicle width direction; and a travel control unit (12) configured to change a travel position of the vehicle in the vehicle width direction within a travel path (L1) where the vehicle is traveling if the contact sensor detects the contact operation in a state where the steering control is executable.

According to this arrangement, the travel position of the vehicle in the vehicle width direction can be changed by a simple contact operation on the operation element. Accordingly, even when the occupant is away from the operation element, the travel position of the vehicle in the vehicle width direction can be easily changed. Further, the travel position of the vehicle in the vehicle width direction can be changed by the contact operation on the operation element in a state where the steering control is executable. That is, the travel position of the vehicle in the vehicle width direction can be easily changed even when the vehicle is traveling.

In the above arrangement, preferably, the vehicle control system further includes a travel position setting unit (71) configured to set a base position (SP) within the travel path where the vehicle is traveling, a first offset position (OP1) offset from the base position to the first side in the vehicle width direction within the travel path where the vehicle is traveling, and a second offset position (OP2) offset from the base position to the second side in the vehicle width direction within the travel path where the vehicle is traveling, wherein the travel control unit is configured to change the travel position of the vehicle in the vehicle width direction from the base position to the first offset position or the second offset position if the contact sensor detects the contact operation in a state where the vehicle is traveling in the base position.

According to this arrangement, by moving the vehicle among the three positions, the travel position of the vehicle in the vehicle width direction can be changed relatively greatly. Accordingly, the occupant can easily recognize that the travel position of the vehicle in the vehicle width direction is changed according to the contact operation on the operation element.

In the above arrangement, preferably, the travel position setting unit is configured to increase offset widths (OW1, OW2) from the base position to the first offset position and the second offset position as a width (LW) of the travel path where the vehicle is traveling increases.

According to this arrangement, appropriate offset widths can be set according to the width of the travel path where the vehicle is traveling. Accordingly, it is possible to prevent the occupant from feeling anxious as the travel position of the vehicle in the vehicle width direction is changed excessively.

In the above arrangement, preferably, the travel control unit is configured to return the travel position of the vehicle in the vehicle width direction from the first offset position or the second offset position to the base position if the vehicle passes through a prescribed spot in a state where the vehicle is traveling in the first offset position or the second offset position.

According to this arrangement, the travel position of the vehicle in the vehicle width direction can be returned from the first offset position or the second offset position to the base position at an appropriate timing.

In the above arrangement, preferably, the travel control unit is configured to change the travel position of the vehicle in the vehicle width direction within the travel path where the vehicle is traveling and to decelerate the vehicle if the contact sensor detects the contact operation and a width of the travel path where the vehicle is traveling is less than a prescribed reference width.

According to this arrangement, two intentions (an intention to change the travel position of the vehicle in the vehicle width direction and an intention to decelerate the vehicle) of the occupant can be reflected in the vehicle control by one contact operation on the operation element. Accordingly, the vehicle control system can be more convenient.

In the above arrangement, preferably, the travel control unit is configured to change the travel position of the vehicle in the vehicle width direction within the travel path where the vehicle is traveling and to decelerate the vehicle if the contact sensor detects the contact operation and a space (Z) outside the travel path satisfies a prescribed deceleration condition.

According to this arrangement, two intentions (an intention to change the travel position of the vehicle in the vehicle width direction and an intention to decelerate the vehicle) of the occupant can be reflected in the vehicle control by one contact operation on the operation element. Accordingly, the vehicle control system can be more convenient.

In the above arrangement, preferably, the travel control unit is configured to change travel paths of the vehicle from a first travel path (L1) where the vehicle is traveling to a second travel path (L2) adjacent to the first travel path if the contact sensor detects the contact operation and an interval (G) from a lane marking (B) between the first travel path and the second travel path to the vehicle is less than a prescribed reference interval.

According to this arrangement, it is possible to reflect an intention of the occupant in the vehicle control while suppressing the travel position of the vehicle in the vehicle width direction from being changed to a position just near the lane marking.

In the above arrangement, preferably, the travel control unit is configured to change the travel position of the vehicle in the vehicle width direction to the second side in the vehicle width direction within the travel path where the vehicle is traveling if the contact sensor detects the contact operation on the operation element from the first side in the vehicle width direction, and the travel control unit is configured to change the travel position of the vehicle in the vehicle width direction to the first side in the vehicle width direction within the travel path where the vehicle is traveling if the contact sensor detects the contact operation on the operation element from the second side in the vehicle width direction.

According to this arrangement, the travel position of the vehicle in the vehicle width direction is changed in a direction corresponding to a direction in which the occupant has performed the contact operation on the operation element. Accordingly, the occupant can intuitively recognize the direction in which the travel position of the vehicle in the vehicle width direction will be changed.

In the above arrangement, preferably, the operation element includes a hub (31) provided rotatably, a disk (32) provided coaxially on an outer circumference of the hub, and a ring (33) provided on an outer circumference of the disk, and the contact sensor is configured to detect the contact operation by a capacitive sensor provided on an outer circumferential part of the ring.

According to this arrangement, the contact operation on the operation element can be reliably detected by the contact sensor.

In the above arrangement, preferably, the vehicle control system further includes a moving device (16) configured to move the operation element in the vehicle width direction and a vehicle length direction with respect to a vehicle body (15), wherein the operation element is movable among a first position (P1) located on the first side in the vehicle width direction, a second position (P2) located on the second side in the vehicle width direction, and a third position (P3) located between the first position and the second position in the vehicle width direction and located more forward than the first position and the second position in the vehicle length direction.

Thus, according to the above arrangements, it is possible to provide a vehicle control system that can easily change the travel position of the vehicle in the vehicle width direction even when the occupant is away from the operation element or even when the vehicle is traveling.

DESCRIPTION OF THE PREFERRED EMBODIMENT(S)

In the following, an embodiment of a vehicle control system 1 according to the present invention will be described with reference to the drawings. Arrows Fr, Re, L, R, U, and Lo, which are appropriately attached to FIG. 2 and subsequent drawings, respectively indicate a front side, a rear side, a left side, a right side, an upper side, and a lower side of a vehicle 2 in which the vehicle control system 1 is provided. In the present embodiment, the lateral direction is defined as the vehicle width direction of the vehicle 2, and the fore and aft direction is defined as the vehicle length direction of the vehicle 2.

<The Configuration of the Vehicle Control System 1>

Figure 1:
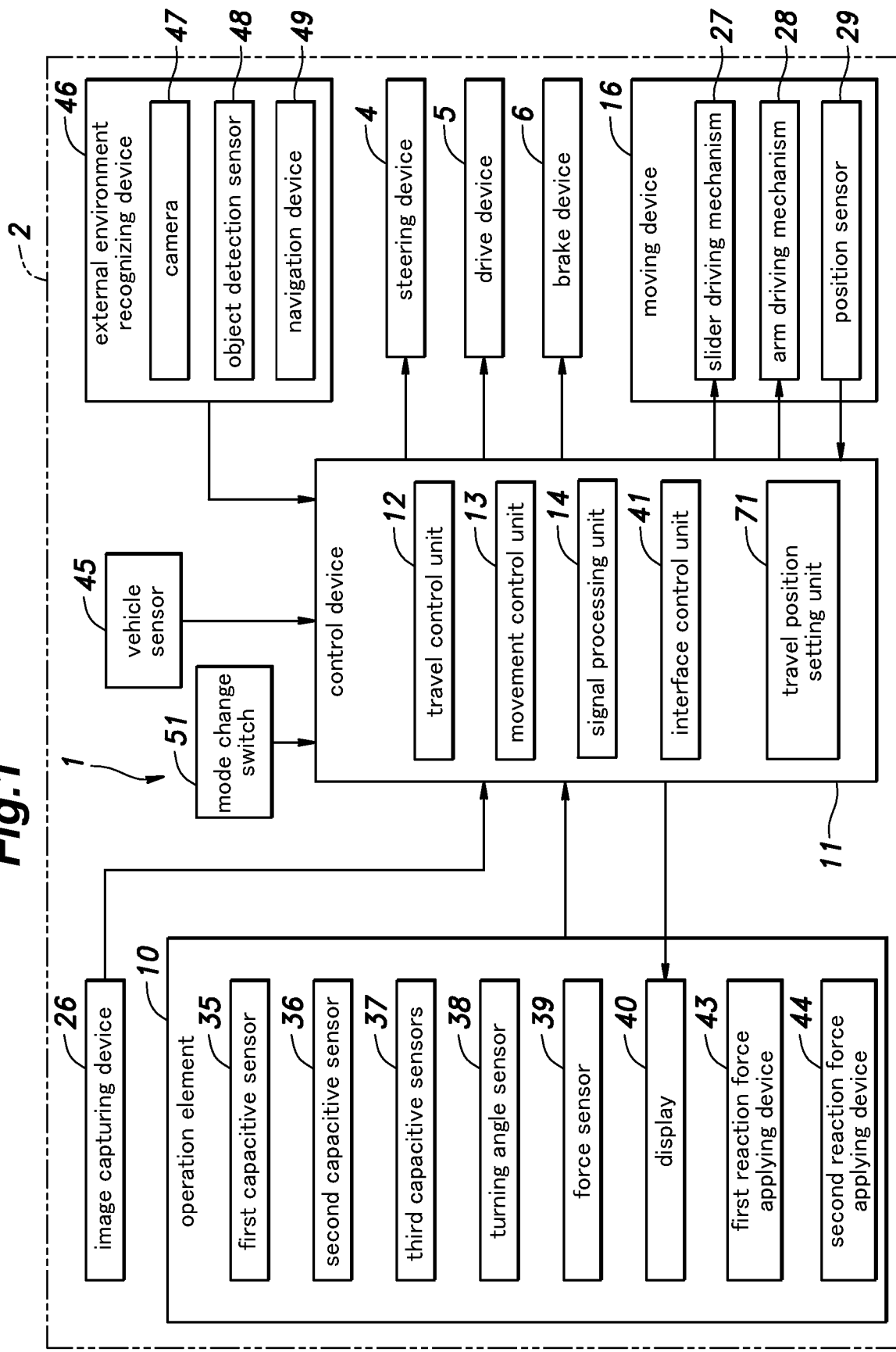
FIG. 1 is a block diagram of a vehicle control system according to an embodiment of the present invention.

As shown in FIG. 1, the vehicle control system 1 is provided in a vehicle 2 which is capable of autonomous driving. The vehicle 2 can travel either in a manual driving mode in which an occupant X mainly performs a driving operation or in an autonomous driving mode in which the vehicle 2 (more specifically, an undermentioned control device 11) mainly performs the driving operation. The vehicle 2 includes a steering device 4 configured to steer wheels of the vehicle 2, a drive device 5 configured to rotate the wheels, and a brake device 6 configured to apply the brakes to the wheels.

The steering device 4 is a device configured to change a steering angle of the wheels, and includes an electric motor and a steering mechanism configured to steer the wheels by a driving force of the electric motor. The steering mechanism includes, for example, a rack-and-pinion mechanism. The drive device 5 is a device configured to rotate the wheels, and includes at least one of an electric motor and an internal combustion engine. The drive device 5 further includes a transmission mechanism configured to transmit a driving force of the at least one of the electric motor and the internal combustion engine to the wheels. If the drive device 5 includes the internal combustion engine, the drive device 5 can apply the brakes to the wheels by engine braking. If the drive device 5 includes the electric motor, the drive device 5 can apply the brakes to the wheels by regenerative braking. The brake device 6 is a device configured to apply resistance to the wheels and thus stop the rotation of the wheels. The brake device 6 includes an electric motor, a hydraulic pressure generating device configured to generate hydraulic pressure as the electric motor is driven, and a brake caliper that presses a brake pad against a brake rotor on receiving the hydraulic pressure from the hydraulic pressure generating device.

The vehicle control system 1 includes an operation element 10 provided with various sensors and a control device 11 connected to the operation element 10. The operation element 10 is a device configured to receive a driving operation by the occupant X to steer the vehicle 2. The operation element 10 may include, for example, a steering wheel or a control stick. An outline of the operation element 10 may be formed in a shape such as a circular shape, a rectangular shape, a shape formed by cutting off a part of a circle, or a shape formed by combining left and right arc parts and upper and lower straight-line parts. The control device 11 includes a hardware processor such as a CPU. The control device 11 includes a travel control unit 12, a movement control unit 13, and a signal processing unit 14. The signal processing unit 14 is configured to detect an operation input by the occupant X based on a signal from the operation element 10, and the travel control unit 12 is configured to control at least one of the steering device 4, the drive device 5, and the brake device 6 according to the operation input detected by the signal processing unit 14. The movement control unit 13 is configured to control the movement of the operation element 10 according to the operation input detected by the signal processing unit 14.

Figure 2:
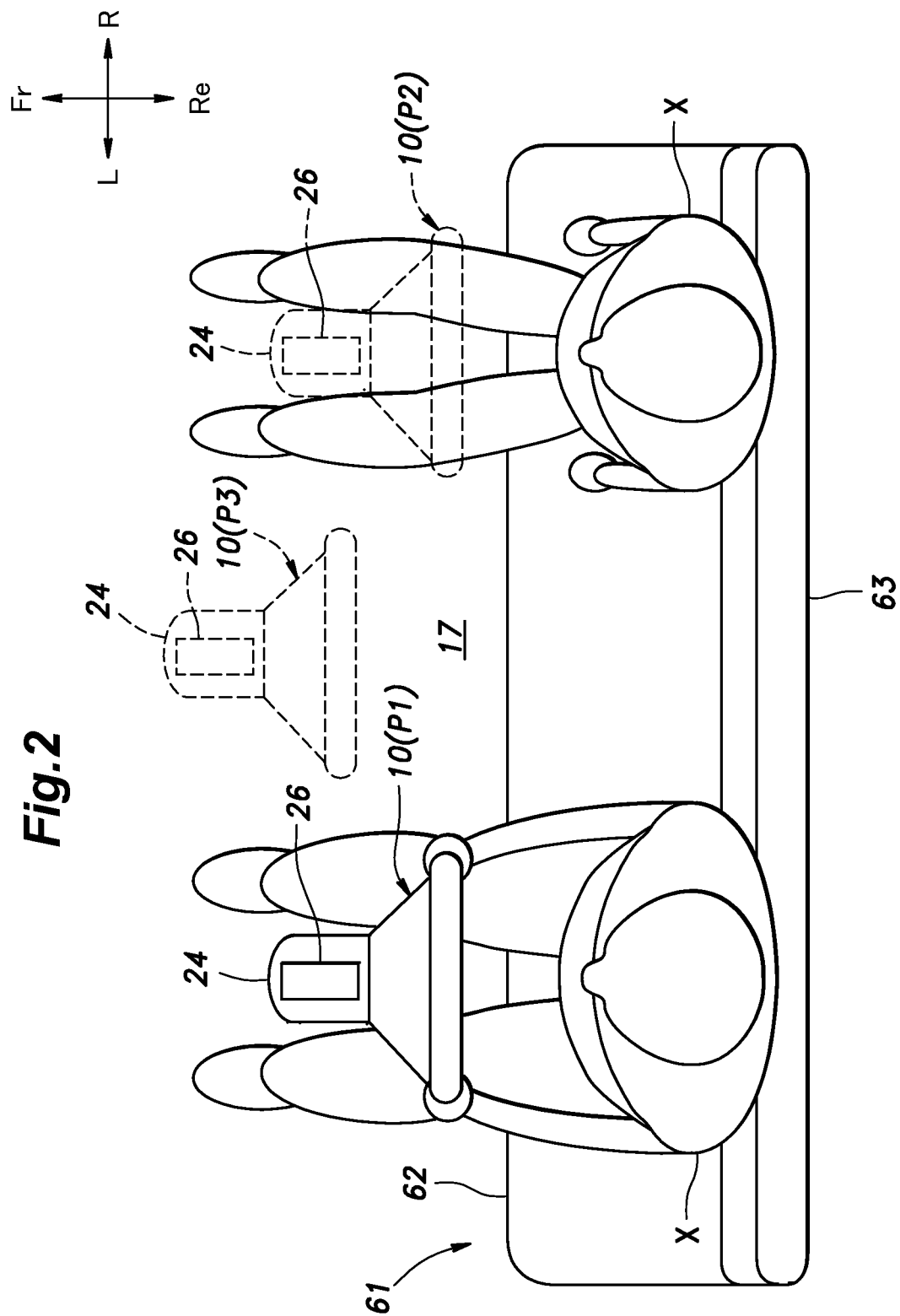
FIG. 2 is a plan view of a front part of a vehicle.
Figure 3:
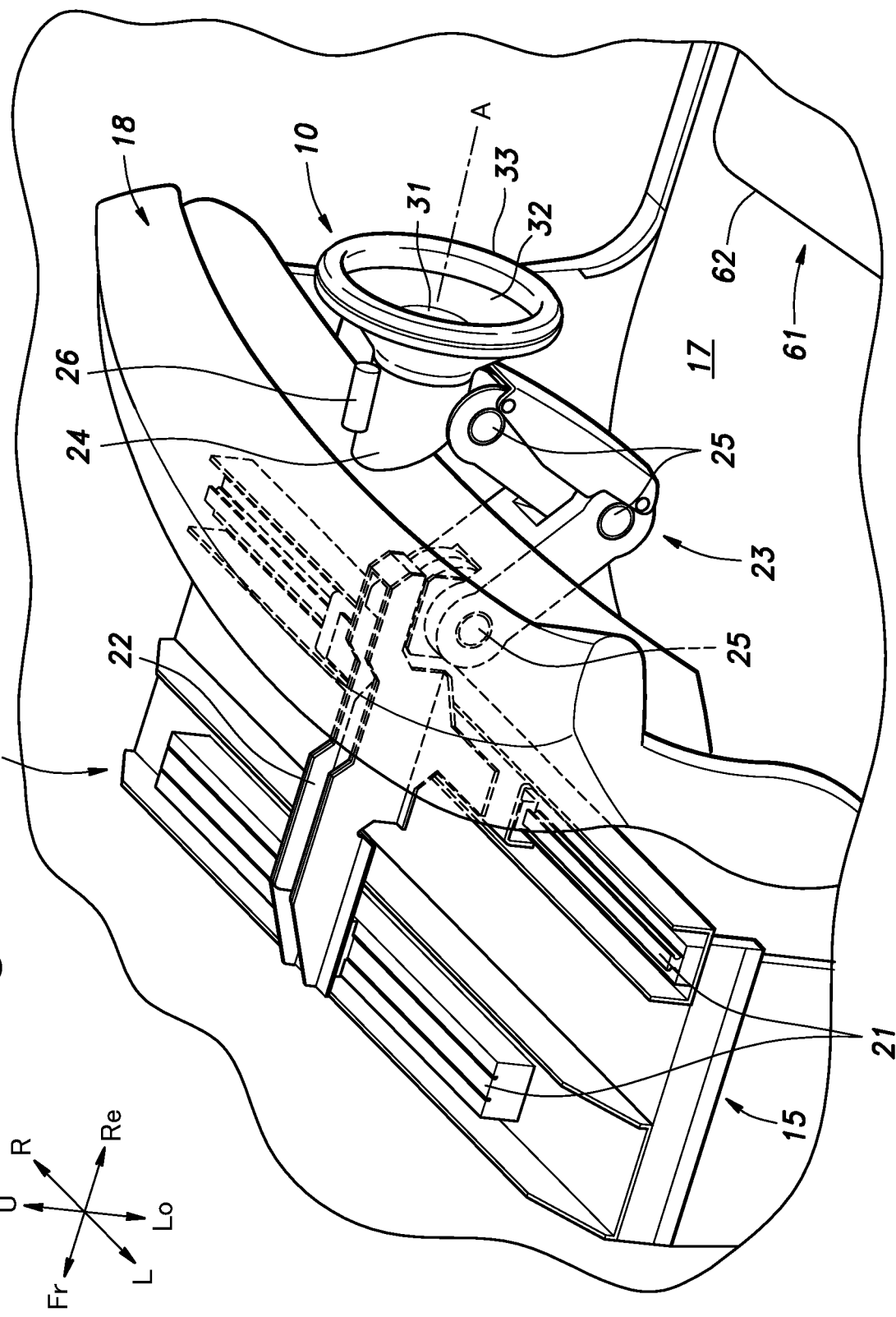
FIG. 3 is a perspective view of the front part of the vehicle.

As shown in FIGS. 2 and 3, a vehicle cabin 17 of the vehicle 2 is provided with an occupant seat 61 on which at least one occupant X (two occupants X are shown in FIG. 2) that performs the driving operation on the operation element 10 is seated. The occupant seat 61 is, for example, a bench seat having a seating space for plural persons, and extends along the lateral direction. By using such a bench seat as the occupant seat 61 in this way, a degree of flexibility in the seating position of the occupant X in the lateral direction can be increased. The occupant seat 61 is attached to a front part of a vehicle body 15 of the vehicle 2 via a base member (not shown). The occupant seat 61 includes a seat cushion 62 on which the occupant X is seated and a seat back 63 provided adjacently to the seat cushion 62 on an upper rear side thereof so as to support the occupant X from a rear side. The seat cushion 62 and the seat back 63 each have a prescribed width in the lateral direction (for example, a width for plural occupants X).

Figure 4:
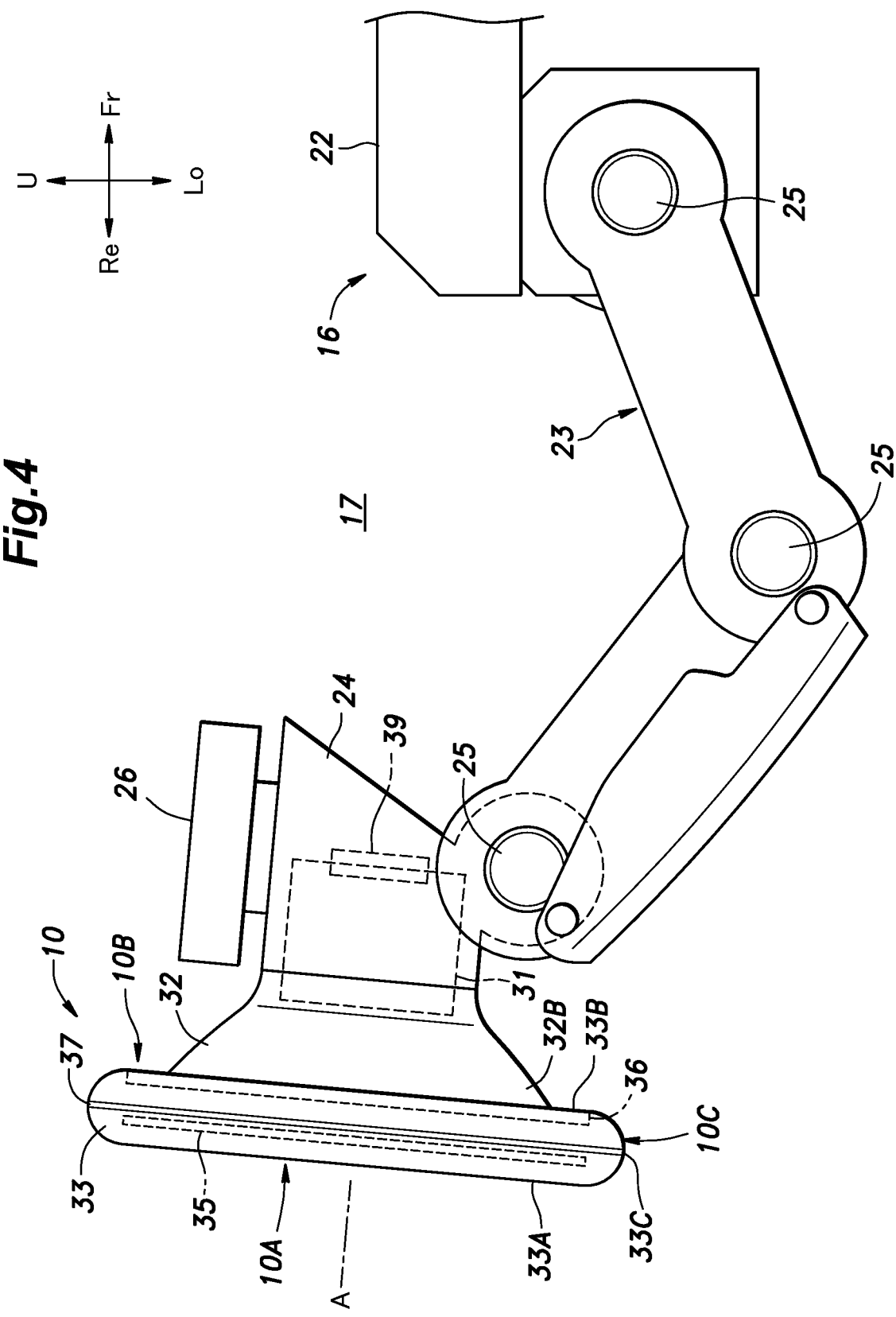
FIG. 4 is a side view of an operation element and a moving device.

As shown in FIGS. 3 and 4, the operation element 10 is supported by the front part of the vehicle body 15 via a moving device 16. The moving device 16 includes a pair of front and rear rails 21 provided on the front part of the vehicle body 15 and extending in the lateral direction, a slider 22 extending in the fore and aft direction so as to be provided between the pair of front and rear rails 21, an arm 23 extending rearward from the slider 22, and a base 24 provided at a rear end of the arm 23 and attached to the operation element 10.

The pair of front and rear rails 21 support the slider 22 such that the slider 22 is movable in the lateral direction. The pair of front and rear rails 21 and the slider 22 are provided in front of an instrument panel 18 that forms a front wall of the vehicle cabin 17 of the vehicle 2. Accordingly, the pair of front and rear rails 21 and the slider 22 are invisible or hardly seen from the occupant X in the vehicle cabin 17 of the vehicle 2, so that the design of the vehicle 2 is improved.

The arm 23 includes joints 25, and passes below the instrument panel 18 in a state where the joints 25 are bent such that the arm 23 protrudes downward. The arm 23 is stretchable in the fore and aft direction, and thereby supporting the base 24 such that the base 24 is movable in the fore and aft direction with respect to the slider 22.

An image capturing device 26 configured to capture an image of a space above the seat cushion 62 is provided on an upper surface of the base 24. The image capturing device 26 is positioned in front of the operation element 10 so as to be adjacent to the operation element 10.

As shown in FIG. 1, the moving device 16 includes a slider driving mechanism 27 and an arm driving mechanism 28. The slider driving mechanism 27 is configured to move the slider 22 in the lateral direction with respect to the rails 21 by an electric motor. Thereby, the slider 22, the arm 23, the base 24, and the operation element 10 move in the lateral direction with respect to the vehicle body 15. The arm driving mechanism 28 is configured to change a stretching degree of the arm 23 in the fore and aft direction by bending the joints 25 with an electric motor. Thereby, the base 24 and the operation element 10 move in the fore and aft direction with respect to the vehicle body 15. As described above, the moving device 16 is configured to move the operation element 10 in the lateral direction and the fore and aft direction with respect to the vehicle body 15.

The moving device 16 further includes a position sensor 29 configured to detect a position of the operation element 10 in the fore and aft direction. For example, the position sensor 29 is attached to the electric motor that forms the arm driving mechanism 28, or to one of the joints 25 of the arm 23. The position sensor 29 may be, for example, a potentiometer or a rotary encoder.

Figure 5:
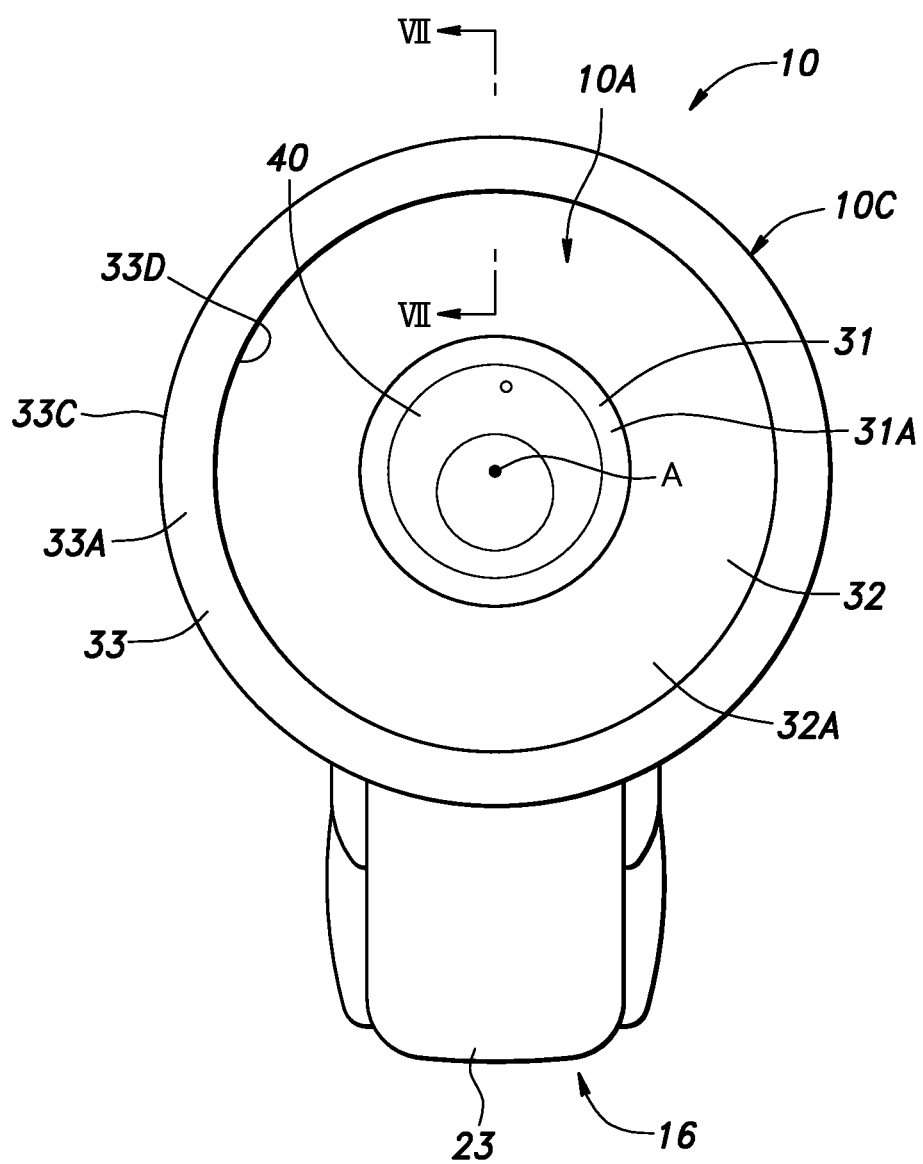
FIG. 5 is a rear view of the operation element and the moving device.

As shown in FIGS. 3 to 5, the operation element 10 includes a hub 31 provided rotatably on the base 24, a disk 32 provided coaxially with the hub 31 on an outer circumference of the hub 31, and a ring 33 provided on an outer circumference of the disk 32. The disk 32 is formed in a circular plate shape. In the present embodiment, the disk 32 extends radially outward from the hub 31 to a side opposite to the base 24 in a direction of a turning axis A of the operation element 10 (the hub 31), and is formed in a cone shape with the hub 31 on the top thereof. The ring 33 is formed in an annular shape around the turning axis A of the operation element 10 (the hub 31), and has a circular cross section. The cross-sectional diameter of the ring 33 is larger than the thickness of the disk 32. The ring 33 functions as a grip portion gripped by the occupant X to perform a turning operation on the operation element 10.

The hub 31 includes a facing part 31A facing a side of the occupant X and a back part (not shown) opposite to the facing part 31A. The disk 32 includes a facing part 32A facing the side of the occupant X and a back part 32B opposite to the facing part 32A. The ring 33 includes a facing part 33A facing the side of the occupant X, a back part 33B opposite to the facing part 33A, an outer circumferential part 33C provided on outer circumferences of the facing part 33A and the back part 33B, and an inner circumferential part 33D provided on inner circumferences of the facing part 33A and the back part 33B. More specifically, when the ring 33 is divided into two parts with a plane including an outer circumferential edge of the ring 33 (a part where the ring 33 has a maximum diameter around the turning axis A of the operation element 10) and an inner circumferential edge of the ring 33 (a part where the ring 33 has a minimum diameter around the turning axis A of the operation element 10), a part arranged on a side of the base 24 is defined as the back part 33B, while a part arranged on a side opposite to the base 24 is defined as the facing part 33A.

The operation element 10 includes a first surface part 10A, a second surface part 10B opposite to the first surface part 10A, and an outer circumferential part 10C provided on outer circumferences of the first surface part 10A and the second surface part 10B. The first surface part 10A is provided on one side along the turning axis A of the operation element 10, and forms a rear surface (one surface in the fore and aft direction) of the operation element 10. The second surface part 10B is provided on the other side along the turning axis A of the operation element 10, and forms a front surface (the other surface in the fore and aft direction) of the operation element 10. The first surface part 10A includes the facing part 31A of the hub 31, the facing part 32A of the disk 32, and the facing part 33A of the ring 33. The second surface part 10B includes the back part 32B of the disk 32 and the back part 33B of the ring 33. The outer circumferential part 10C includes the outer circumferential part 33C of the ring 33. In another embodiment, the first surface part 10A may include the back part 32B of the disk 32 and the back part 33B of the ring 33, and the second surface part 10B may include the facing part 31A of the hub 31, the facing part 32A of the disk 32, and the facing part 33A of the ring 33.

As shown in FIG. 1, the operation element 10 is provided with a first capacitive sensor 35, a second capacitive sensor 36, and third capacitive sensors 37, which function as contact sensors. The operation element 10 is also provided with a turning angle sensor 38 and a force sensor 39. The turning angle sensor 38 is configured to detect a turning angle of the operation element 10 with respect to the vehicle body 15. The turning angle sensor 38 may be a rotary encoder, a resolver, or the like. In another embodiment, the operation element 10 may be provided with a gyro sensor configured to detect the turning speed of the operation element 10.

The force sensor 39 may be a known piezoelectric sensor or a known strain gauge sensor, and is provided between the base 24 and the hub 31. The force sensor 39 is, for example, a six-axis force sensor configured to detect the loads applied to the operation element 10 to the front side along the turning axis A (one side in the fore and aft direction), to the rear side along the turning axis A (the other side in the fore and aft direction), to the left side (the first side in the lateral direction), to the right side (the second side in the lateral direction), to the upper side along a direction orthogonal to the turning axis A (one side in the up-and-down direction), and to the lower side along the direction orthogonal to the turning axis A (the other side in the up-and-down direction).

Figure 6:
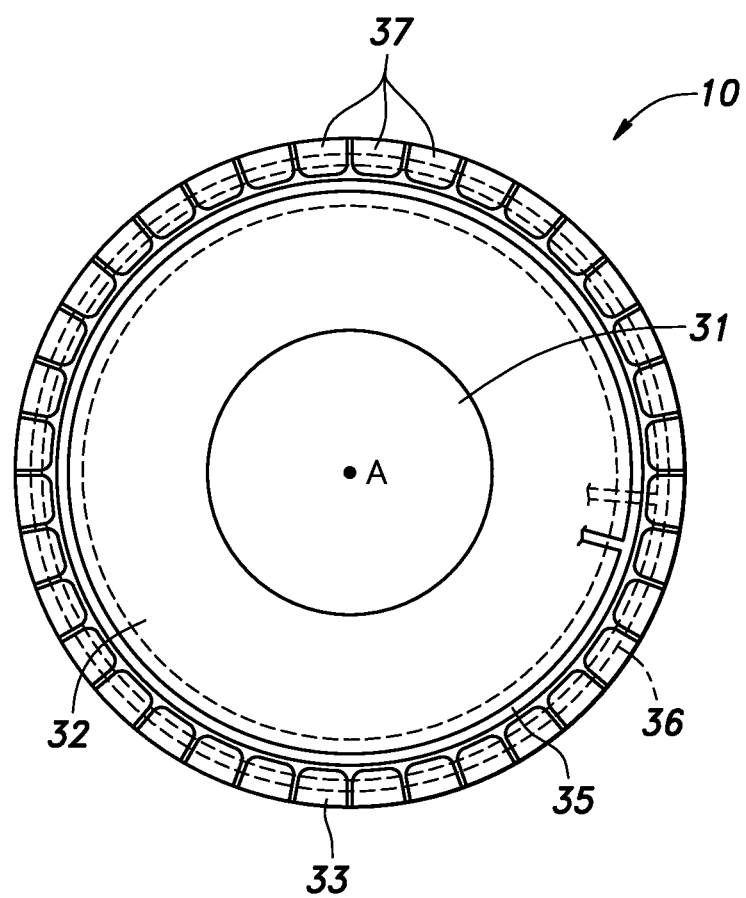
FIG. 6 is an explanatory diagram showing a positional relationship among first to third capacitive sensors provided in the operation element.
Figure 7:
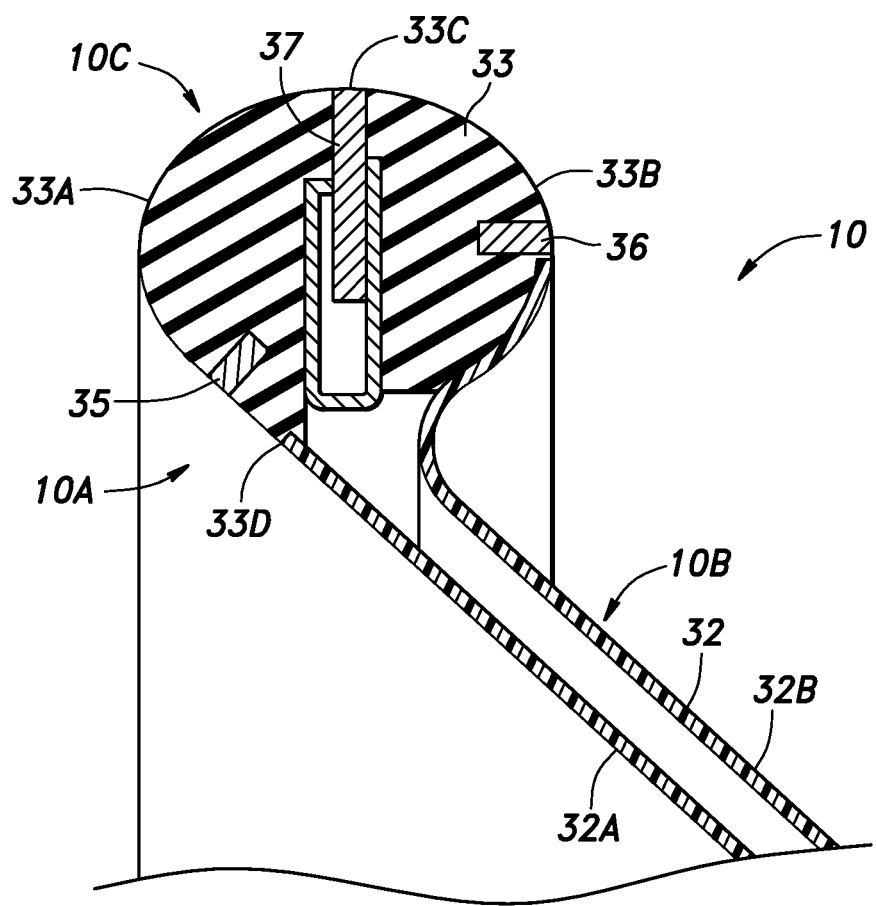
FIG. 7 is a sectional view of the operation element taken along a line VII-VII of FIG. 5.

As shown in FIGS. 4, 6, and 7, the first to third capacitive sensors 35 to 37 are contact sensors configured to detect approach and contact of an object such as the occupant X's hand (finger) according to a change in capacitance. The first to third capacitive sensors 35 to 37 are provided on the ring 33 of the operation element 10.

The first capacitive sensor 35 is provided on the first surface part 10A of the operation element 10, the second capacitive sensor 36 is provided on the second surface part 10B of the operation element 10, and the third capacitive sensors 37 are provided on the outer circumferential part 10C of the operation element 10. More specifically, the first capacitive sensor 35 is provided on the facing part 33A of the ring 33, the second capacitive sensor 36 is provided on the back part 33B of the ring 33, and the third capacitive sensors 37 are provided on the outer circumferential part 33C of the ring 33. In another embodiment, the first capacitive sensor 35 may be provided on the back part 33B of the ring 33, and the second capacitive sensor 36 may be provided on the facing part 33A of the ring 33.

The first capacitive sensor 35 is a single sensor formed in an annular shape and provided coaxially with the ring 33 along the facing part 33A of the ring 33. In another embodiment, plural first capacitive sensors 35 may be arranged in the circumferential direction along the facing part 33A of the ring 33. The first capacitive sensor 35 is preferably provided on an inner circumferential side of the facing part 33A. More specifically, when viewed in the direction along the turning axis A of the operation element 10, the first capacitive sensor 35 is preferably provided on a radially inner side with respect to a center circle that passes through a widthwise central part of the ring 33. Namely, the first capacitive sensor 35 is preferably provided on the inner circumferential part 33D of the ring 33.

The second capacitive sensor 36 is a single sensor formed in an annular shape and provided coaxially with the ring 33 along the back part 33B of the ring 33. In another embodiment, plural second capacitive sensors 36 may be arranged in the circumferential direction along the back part 33B of the ring 33. The second capacitive sensor 36 preferably extends along a widthwise central part of the back part 33B. The second capacitive sensor 36 preferably has a larger diameter than the first capacitive sensor 35.

The third capacitive sensors 37 are provided along an outer edge of the operation element 10 and configured to identify a contact position of the hand of the occupant X (a position of a contact operation by the occupant X). In another embodiment, a single third capacitive sensor 37 may extend along the outer edge of the operation element 10, or plural third capacitive sensors 37 may be divided along the outer edge of the operation element 10. In the present embodiment, the third capacitive sensors 37 are arranged in the circumferential direction along the outer circumferential part 33C of the ring 33, which includes the outer circumferential edge of the ring 33. The third capacitive sensors 37 each have the same angular length in the circumferential direction, and are arranged adjacently to each other at equal intervals. Preferably, the gaps between the adjacent third capacitive sensors 37 are as small as possible. In the present embodiment, thirty-six third capacitive sensors 37 each having an angular length of about 10 degrees are provided.

The first to third capacitive sensors 35 to 37 are configured to output signals corresponding to the capacitance thereof. The capacitance of the first to third capacitive sensors 35 to 37 increases as the object such as the occupant X's hand approaches the respective sensors 35 to 37, as the size of the approaching object increases, and as the relative permittivity of the approaching object increases.

The first to third capacitive sensors 35 to 37 function as grip sensors configured to detect that the operation element 10 is gripped by the occupant X. For example, the first to third capacitive sensors 35 to 37 detect that the operation element 10 is gripped by the occupant X if the capacitance of at least one of the first capacitive sensor 35 and the second capacitive sensor 36 has increased to a prescribed reference value or more and the capacitance of the third capacitive sensors 37 equal to or more than a prescribed number has increased to the prescribed reference value or more. In another embodiment, the first to third capacitive sensors 35 to 37 may be configured to detect that the operation element 10 is gripped by the occupant X according to a detecting method different from the above method.

As shown in FIG. 5, a display 40 as a display unit is provided on the facing part 31A of the hub 31 (a side of the occupant X of the hub 31). The display 40 is formed in a circular shape and occupies 50% or more of the area of the facing part 31A of the hub 31. As shown in FIG. 1, the display 40 is configured to be controlled by an interface control unit 41 of the control device 11, thereby displaying images indicating a driving mode (the autonomous driving mode or the manual driving mode) of the vehicle 2, a travel direction (a future trajectory) of the vehicle 2, the position of a surrounding vehicle traveling around the vehicle 2, the speed of the vehicle 2, or the like. The images displayed on the display 40 may include numerical values and symbols.

A first reaction force applying device 43 (see FIG. 1) configured to apply a reaction force (turning resistance) to the turning (or the turning operation) of the operation element 10 with respect to the vehicle body 15 is provided between the vehicle body 15 and the operation element 10. The first reaction force applying device 43 is, for example, an electric motor, and configured to apply a rotational force of the electric motor to the operation element 10 as the reaction force to the turning of the operation element 10. In the present embodiment, the first reaction force applying device 43 is provided in the base 24, and configured to apply the reaction force to the turning of the hub 31 with respect to the base 24. The first reaction force applying device 43 can restrict the turning of the operation element 10 by applying sufficient turning resistance to the operation element 10. Namely, the first reaction force applying device 43 functions as a turning restriction device configured to restrict the turning of the operation element 10 with respect to the vehicle body 15.

A second reaction force applying device 44 (see FIG. 1) configured to apply a reaction force (movement resistance) to the movement (or the moving operation) of the operation element 10 along the turning axis A with respect to the vehicle body 15 is provided between the vehicle body 15 and the operation element 10. The second reaction force applying device 44 is, for example, the electric motor that forms the arm driving mechanism 28, and configured to apply a rotational force of the electric motor to the operation element 10 as the reaction force to the movement of the operation element 10 in the fore and aft direction. The second reaction force applying device 44 can restrict the movement of the operation element 10 in the fore and aft direction by applying sufficient movement resistance to the operation element 10. Namely, the second reaction force applying device 44 functions as a movement restriction device configured to restrict the movement of the operation element 10 in the fore and aft direction with respect to the vehicle body 15.

As shown in FIG. 1, the control device 11 is connected to a vehicle sensor 45 configured to detect various state quantities of the vehicle 2 and an external environment recognizing device 46 configured to detect environmental information around the vehicle 2. The vehicle sensor 45 includes, for example, a vehicle speed sensor configured to detect the speed of the vehicle 2, an acceleration sensor configured to detect the acceleration of the vehicle 2, and a yaw rate sensor configured to detect the yaw rate of the vehicle 2. The control device 11 is configured to acquire the various state quantities of the vehicle 2 from the vehicle sensor 45.

The external environment recognizing device 46 is configured to acquire surrounding vehicle information and surrounding environment information, thereby outputting the surrounding vehicle information and the surrounding environment information to the control device 11. The external environment recognizing device 46 includes a camera 47 configured to capture an image around the vehicle 2, an object detection sensor 48 such as a laser or a lidar configured to detect an object present around the vehicle 2, and a navigation device 49. The external environment recognizing device 46 is configured to identify lanes (travel paths) and lane markings based on the image captured by the camera 47. Also, the external environment recognizing device 46 is configured to acquire the surrounding vehicle information, which includes information about the position and the speed of the surrounding vehicle traveling around the vehicle 2, based on the image captured by the camera 47 and a detection signal of the object detection sensor 48. Also, the external environment recognizing device 46 is configured to acquire the surrounding environment information, which includes information about a first travel path where the vehicle is traveling, a second travel path adjacent to the first travel path, stores around the vehicle 2, and branch roads around the vehicle 2, based on the position of the vehicle 2 (namely, the own vehicle), map information, and Point of Interest (POI) acquired by the navigation device 49.

<The Driving Operation on the Operation Element 10>

The operation element 10 is configured to receive a first driving operation and a second driving operation as the driving operation. The first driving operation and the second driving operation each include an acceleration/deceleration operation and a steering operation different from each other. The first driving operation is a driving operation performed by touching the operation element 10 (for example, a single tap operation, a double tap operation, a long press operation, and a stroke operation). Accordingly, the movable amount of the operation element 10 according to the first driving operation is zero or extremely small. The second driving operation is a driving operation performed by turning or moving the operation element 10. Accordingly, the movable amount of the operation element 10 according to the second driving operation is larger than that of the operation element 10 according to the first driving operation. In this way, the first driving operation is a contact operation on the operation element 10, while the second driving operation is a turning operation or a moving operation on the operation element 10. Accordingly, it is possible to clearly distinguish the first driving operation and the second driving operation and avoid confusion between the two.

The first driving operation includes a stroke operation in the circumferential direction on the outer circumferential part 33C of the ring 33 by the hand of the occupant X. When the hand of the occupant X strokes the outer circumferential part 33C of the ring 33 in the circumferential direction, the capacitance of the third capacitive sensors 37 arranged in the circumferential direction changes sequentially. The signal processing unit 14 detects the stroke operation on the ring 33 by the occupant X based on the signals from the third capacitive sensors 37. Also, the signal processing unit 14 detects the direction and the length of the stroke operation based on the signals from the third capacitive sensors 37. The travel control unit 12 may control the steering device 4 according to the direction and the length of the stroke operation detected by the signal processing unit 14, thereby moving (offsetting) the vehicle 2 in the vehicle width direction, changing the lanes, and turning the vehicle 2 right or left.

Further, the first driving operation includes the contact operation on the facing part 33A or the back part 33B of the ring 33 by the occupant X. The contact operation includes, for example, a single tap operation, a double tap operation, and a long press operation. When the hand of the occupant X performs the contact operation on the facing part 33A or the back part 33B of the ring 33, the capacitance of the first capacitive sensor 35 or the second capacitive sensor 36 changes. The signal processing unit 14 determines the contact duration and the contact number of the hand of the occupant X based on the detection signal from the first capacitive sensor 35 or the second capacitive sensor 36, thereby determining whether the contact operation is either of a single tap operation, a double tap operation, and a long press operation.

For example, the travel control unit 12 executes the acceleration control in response to the operation on the facing part 33A, and executes the deceleration control in response to the operation on the back part 33B. The acceleration control includes the control to increase the target speed of the vehicle 2 by a predetermined value from the current value, the control to decrease the target vehicle-to-vehicle distance (namely, the distance between the vehicle 2 (namely, the own vehicle) and the preceding vehicle traveling in front of the vehicle 2) by a predetermined value from the current value, and the control to start the movement of the vehicle 2 from a state where the vehicle 2 is stopped. The deceleration control includes the control to decrease the target speed of the vehicle 2 by a predetermined value from the current value, the control to increase the target vehicle-to-vehicle distance by a predetermined value from the current value, and the control to stop the vehicle 2 from a state where the vehicle 2 is traveling at low speed. The travel control unit 12 may change the control to execute or the changing amount of the target speed of the vehicle 2 according to the mode of the operation on the facing part 33A or the back part 33B. For example, the travel control unit 12 may make the changing amount of the target speed of the vehicle 2 in response to a double tap operation larger than that of the target speed of the vehicle 2 in response to a single tap operation. Also, the travel control unit 12 may keep on increasing or decreasing the target speed of the vehicle 2 while a long press operation is being performed on the facing part 33A or the back part 33B.

The second driving operation includes the turning operation on the operation element 10 around the turning axis A and the moving operation (push/pull operation) on the operation element 10 along the turning axis A. When the occupant X performs the turning operation on the operation element 10, the turning angle sensor 38 detects the turning angle of the operation element 10 with respect to the vehicle body 15. The signal processing unit 14 acquires the turning angle of the operation element 10 based on the detection signal from the turning angle sensor 38, and the travel control unit 12 controls the steering device 4 according to the acquired turning angle, thereby steering the wheels of the vehicle 2.

When the occupant X performs the moving operation on the operation element 10 to the front side (namely, when the occupant X pushes the operation element 10), the force sensor 39 detects the load applied to the operation element 10 to the front side. The signal processing unit 14 acquires the load applied to the operation element 10 and the direction of the load based on the detection signal from the force sensor 39, and the travel control unit 12 controls the drive device 5 according to the acquired load and the acquired direction of the load, thereby accelerating the vehicle 2. When the occupant X performs the moving operation on the operation element 10 to the rear side (namely, when the occupant X pulls the operation element 10), the force sensor 39 detects the load applied to the operation element 10 to the rear side. The signal processing unit 14 acquires the load applied to the operation element 10 and the direction of the load based on the detection signal from the force sensor 39, and the travel control unit 12 controls at least one of the drive device 5 and the brake device 6 according to the acquired load and the acquired direction of the load, thereby decelerating the vehicle 2. In another embodiment, the position sensor 29 may detect the moving operation on the operation element 10 by the occupant X, and the travel control unit 12 may execute the acceleration/deceleration control of the vehicle 2 based on the signal from the position sensor 29.

<The Driving Mode of the Vehicle 2>

The travel control unit 12 is configured to switch the driving mode of the vehicle 2 between the autonomous driving mode and the manual driving mode. In the autonomous driving mode, the travel control unit 12 automatically executes the steering control and the acceleration/deceleration control. In the manual driving mode, the occupant X manually performs the steering operation and the acceleration/deceleration operation.

In the autonomous driving mode, the travel control unit 12 independently creates a future trajectory of the vehicle 2, thereby controlling the steering device 4, the drive device 5, and the brake device 6. However, even in the autonomous driving mode, the travel control unit 12 receives the first driving operation on the operation element 10 by the occupant X, thereby causing the control of the steering device 4, the drive device 5, and the brake device 6 to reflect the intention of the occupant X. That is, the first driving operation is an auxiliary driving operation in the autonomous driving mode.

In the manual driving mode, the travel control unit 12 controls the steering device 4, the drive device 5, and the brake device 6 according to the second driving operation on the operation element 10 by the occupant X. That is, the second driving operation is an independent driving operation in the manual driving mode. In another embodiment, in the manual driving mode, the travel control unit 12 may control the drive device 5 and the brake device 6 according to a pressing operation on an accelerator pedal or a brake pedal by the occupant X.

<The Position of the Operation Element 10>

With reference to FIG. 2, the operation element 10 is movable among a first position P1 as an allowance position, a second position P2 as an allowance position, and a third position P3 as a restriction position. The first position P1 is located on the left side (the first side in the lateral direction) with respect to the center of the vehicle 2 in the lateral direction, and the second position P2 is located on the right side (the second side in the lateral direction) with respect to the center of the vehicle 2 in the lateral direction. That is, the first position P1 and the second position P2 are offset from each other in the lateral direction and separated from each other. The third position P3 is located at the center of the vehicle 2 in the lateral direction. The third position P3 is located between the first position P1 and the second position P2 in the lateral direction (more specifically, located in the middle of the first position P1 and the second position P2 in the lateral direction), and is offset from the first position P1 and the second position P2 in the lateral direction. The third position P3 is located more forward than the first position P1 and the second position P2 in the fore and aft direction. Accordingly, when the occupant X does not operate the operation element 10 (for example, when the autonomous driving mode is executed or when the occupant X gets on or off the vehicle 2), the operation element 10 is moved to the third position P3, so that the operation element 10 and the occupant X can be separated from each other. Accordingly, it is possible to prevent the operation element 10 from oppressing the occupant X.

In a state where the operation element 10 is located in the first position P1 or the second position P2, the vehicle 2 can travel in the autonomous driving mode and the manual driving mode. More specifically, in a state where the operation element 10 is located in the first position P1 or the second position P2, the travel control unit 12 switches the driving mode of the vehicle 2 between the manual driving mode and the autonomous driving mode according to an operation on a mode change switch 51 (see FIG. 1) by the occupant X. In a state where the operation element 10 is located in the third position P3, the vehicle 2 can travel only in the autonomous driving mode, and the manual driving mode cannot be selected. In a state where the operation element 10 is located between the first position P1 and the third position P3 or between the second position P2 and the third position P3, the vehicle 2 can travel only in the autonomous driving mode, and the manual driving mode cannot be selected.

In a state where the operation element 10 is located in the first position P1 or the second position P2, the operation element 10 can receive both the first driving operation and the second driving operation. More specifically, in a state where the operation element 10 is located in the first position P1 or the second position P2 and the driving mode of the vehicle 2 is set to the autonomous driving mode, the operation element 10 can receive the first driving operation. On the other hand, in a state where the operation element 10 is located in the first position P1 or the second position P2 and the driving mode of the vehicle 2 is set to the manual driving mode, the operation element 10 can receive the second driving operation.

In a state where the operation element 10 is located in the third position P3, between the first position P1 and the third position P3, or between the second position P2 and the third position P3, the driving mode of the vehicle 2 is set to the autonomous driving mode, and the operation element 10 can receive the first driving operation and cannot receive the second driving operation. Thus, in the third position P3 where the operation element 10 and the occupant X are separated from each other, it is possible to prevent the execution of the second driving operation, which makes the movable amount of the operation element 10 relatively large. Accordingly, it is possible to prevent an erroneous operation on the operation element 10 located in the third position P3.

<The Setting of the Travel Position of the Vehicle 2>

As shown in FIG. 1, the control device 11 includes a travel position setting unit 71 configured to set the travel position of the vehicle 2 in the lateral direction (hereinafter, simply referred to as "the travel position of the vehicle 2").

Figure 8:
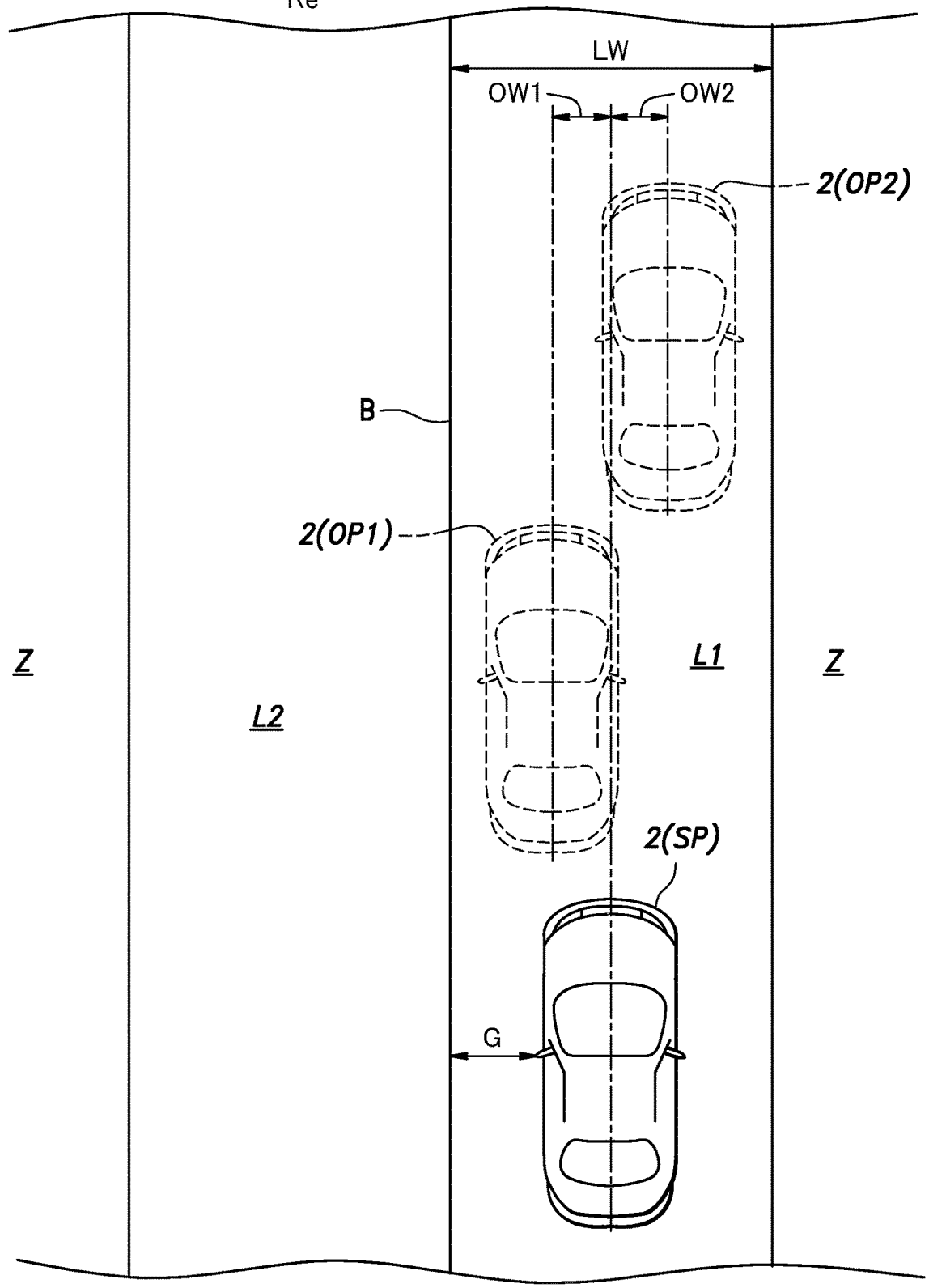
FIG. 8 is a plan view showing a state where the vehicle is traveling on a travel path.

With reference to FIG. 8, the travel position setting unit 71 is configured to set a base position SP within a lane L1 (an example of a first travel path) where the vehicle 2 is traveling, a first offset position OP1 offset from the base position SP to the left side (the first side in the lateral direction) within the lane L1, and a second offset position OP2 offset from the base position SP to the right side (the second side in the lateral direction) within the lane L1. In another embodiment, the travel position setting unit 71 may set a position offset from the base position SP to the right side within the lane L1 as the first offset position OP1, and a position offset from the base position SP to the left side within the lane L1 as the second offset position OP2.

The travel position setting unit 71 increases an offset width OW1 from the base position SP to the first offset position OP1 and an offset width OW2 from the base position SP to the second offset position OP2 as a width LW of the lane L1 increases. Thus, appropriate offset widths OW1, OW2 can be set according to the width LW of the lane L1. Accordingly, it is possible to prevent the occupant X from feeling anxious as the travel position of the vehicle 2 is changed excessively.

<The Change in the Travel Position of the Vehicle 2>

With reference to FIGS. 5, 6, and 8, when the occupant X performs a tap operation (for example, a single tap operation or a double tap operation) on the outer circumferential part 33C of the ring 33 from the right side (the second side in the lateral direction) in a state where the vehicle 2 is traveling in the base position SP in the autonomous driving mode, the capacitance of the third capacitive sensors 37 located on the right side of the turning axis A changes. The signal processing unit 14 detects the tap operation on the outer circumferential part 33C of the ring 33 from the right side by the occupant X based on the detection signal from the third capacitive sensors 37 located on the right side of the turning axis A. The travel control unit 12 controls the steering device 4 according to the direction of the tap operation detected by the signal processing unit 14, thereby changing the travel position of the vehicle 2 from the base position SP to the first offset position OP1. That is, the travel control unit 12 changes the travel position of the vehicle 2 to the left side (the first side in the lateral direction).

On the other hand, when the occupant X performs the tap operation on the outer circumferential part 33C of the ring 33 from the left side (the first side in the lateral direction) in a state where the vehicle 2 is traveling in the base position SP in the autonomous driving mode, the capacitance of the third capacitive sensors 37 located on the left side of the turning axis A changes. The signal processing unit 14 detects the tap operation on the outer circumferential part 33C of the ring 33 from the left side by the occupant X based on the detection signal from the third capacitive sensors 37 located on the left side of the turning axis A. The travel control unit 12 controls the steering device 4 according to the direction of the tap operation detected by the signal processing unit 14, thereby changing the travel position of the vehicle 2 from the base position SP to the second offset position OP2. That is, the travel control unit 12 changes the travel position of the vehicle 2 to the right side (the second side in the lateral direction).

As described above, if the third capacitive sensors 37 detect the tap operation on the operation element 10 from the left side or the right side in a state where the vehicle 2 is traveling in the autonomous driving mode, the travel control unit 12 changes the travel position of the vehicle 2 within the lane L1. Accordingly, the travel position of the vehicle 2 can be changed by a simple contact operation on the operation element 10. Accordingly, even when the occupant X is away from the operation element 10 (for example, even when the operation element 10 is located in the third position P3), the travel position of the vehicle 2 can be easily changed. Further, the travel position of the vehicle 2 can be changed by the contact operation on the operation element 10 when the vehicle is traveling in the autonomous driving mode. That is, the travel position of the vehicle 2 can be easily changed even when the vehicle 2 is traveling.

Further, the travel control unit 12 changes the travel position of the vehicle 2 from the base position SP to the first offset position OP1 or the second offset position OP2 if the third capacitive sensors 37 detect the tap operation in a state where the vehicle 2 is traveling in the base position SP. Thus, by moving the vehicle 2 among the three positions, the travel position of the vehicle 2 can be changed relatively greatly. Accordingly, the occupant X can easily recognize that the travel position of the vehicle 2 is changed according to the tap operation on the operation element 10. In another embodiment, the travel control unit 12 may change the travel position of the vehicle 2 between two positions or among four or more positions, or may change the travel position of the vehicle 2 continuously (or in a stepless manner).

Further, if the third capacitive sensors 37 detect the tap operation on the operation element 10 from the right side, the travel control unit 12 changes the travel position of the vehicle 2 to the left side within the lane L1. On the other hand, if the third capacitive sensors 37 detect the tap operation on the operation element 10 from the left side, the travel control unit 12 changes the travel position of the vehicle 2 to the right side within the lane L1. Namely, if the occupant X performs the tap operation on the operation element 10 from the right side to the left side, the travel control unit 12 changes the travel position of the vehicle 2 to the left side. On the other hand, if the occupant X performs the tap operation on the operation element 10 from the left side to the right side, the travel control unit 12 changes the travel position of the vehicle 2 to the right side. Accordingly, the travel position of the vehicle 2 is changed in a direction corresponding to a direction in which the occupant X has performed the tap operation on the operation element 10. Accordingly, the occupant X can intuitively recognize the direction in which the travel position of the vehicle 2 will be changed. In another embodiment, if the third capacitive sensors 37 detect the tap operation on the operation element 10 from the left side, the travel control unit 12 may change the travel position of the vehicle 2 to the left side within the lane L1. On the other hand, if the third capacitive sensors 37 detect the tap operation on the operation element 10 from the right side, the travel control unit 12 may change the travel position of the vehicle 2 to the right side within the lane L1.

Further, the third capacitive sensors 37 provided on the outer circumferential part 33C of the ring 33 detect the tap operation on the operation element 10. Accordingly, the tap operation on the operation element 10 can be detected reliably. In another embodiment, the first capacitive sensor 35 or the second capacitive sensor 36 may detect the tap operation on the operation element 10, or a sensor (for example, a pressure sensor) other than a capacitive sensor may detect the tap operation on the operation element 10.

In the present embodiment, the travel control unit 12 changes the travel position of the vehicle 2 according to the tap operation on the operation element 10. On the other hand, in another embodiment, the travel control unit 12 may change the travel position of the vehicle 2 according to a contact operation other than the tap operation (for example, a long press operation or a stroke operation) on the operation element 10.

In the present embodiment, the travel control unit 12 changes the travel position of the vehicle 2 in a state where the vehicle 2 is traveling in the autonomous driving mode. That is, in the present embodiment, the travel control unit 12 changes the travel position of the vehicle 2 in a state where the travel control unit 12 can automatically perform both the steering control and the acceleration/deceleration control of the vehicle 2. On the other hand, in another embodiment, the travel control unit 12 may change the travel position of the vehicle 2 in a state where the travel control unit 12 can automatically execute the steering control and the occupant X can manually execute at least one of the acceleration operation and the deceleration operation.

While the vehicle 2 is traveling in the base position SP in the autonomous driving mode, the third capacitive sensors 37 may detect the tap operation on the operation element 10 from the left side or the right side in a state where a width LW of the lane L1 is less than a prescribed reference width. In such a case, the travel control unit 12 changes the travel position of the vehicle 2 from the base position SP to the first offset position OP1 or the second offset position OP2 and decelerates the vehicle 2. According to this control, two intentions (an intention to change the travel position of the vehicle 2 and an intention to decelerate the vehicle 2) of the occupant X can be reflected in the vehicle control by one tap operation on the operation element 10. Accordingly, the vehicle control system 1 can be more convenient.

While the vehicle 2 is traveling in the base position SP in the autonomous driving mode, the third capacitive sensors 37 may detect the tap operation on the operation element 10 from the left side or the right side in a state where a space Z outside the lanes L1 and L2 satisfies a prescribed deceleration condition (for example, a specific landmark or a specific landscape is present in the space Z outside the lanes L1 and L2). The travel control unit 12 may recognize that the space Z outside the lanes L1 and L2 satisfies the prescribed deceleration condition based on the surrounding environment information acquired by the external environment recognizing device 46. In such a case, the travel control unit 12 changes the travel position of the vehicle 2 from the base position SP to the first offset position OP1 or the second offset position OP2 and decelerates the vehicle 2. According to this control, two intentions (an intention to change the travel position of the vehicle 2 and an intention to decelerate the vehicle 2) of the occupant X can be reflected in the vehicle control by one tap operation on the operation element 10. Accordingly, the vehicle control system 1 can be more convenient.

The vehicle 2 may pass through a prescribed spot (for example, an intersection or a junction) in a state where the vehicle 2 is traveling in the first offset position OP1 or the second offset position OP2. The travel control unit 12 may recognize that the vehicle 2 passes through the prescribed spot based on the surrounding environment information acquired by the external environment recognizing device 46. In such a case, the travel control unit 12 returns the travel position of the vehicle 2 from the first offset position OP1 or the second offset position OP2 to the base position SP. Accordingly, the travel position of the vehicle 2 can be returned from the first offset position OP1 or the second offset position OP2 to the base position SP at an appropriate timing. In another embodiment, the travel control unit 12 may return the travel position of the vehicle 2 from the first offset position OP1 or the second offset position OP2 to the base position SP if the third capacitive sensors 37 detect the tap operation from the side opposite to the side on which the third capacitive sensors 37 detect the tap operation when the travel position of the vehicle 2 is changed from the base position SP to the first offset position OP1 or the second offset position OP2. Alternatively, in another embodiment, the travel control unit 12 may return the travel position of the vehicle 2 from the first offset position OP1 or the second offset position OP2 to the base position SP if the relative positional relationship between the vehicle 2 (namely, the own vehicle) and the surrounding vehicle has changed.

While the vehicle 2 is traveling in the base position SP in the autonomous driving mode, the third capacitive sensors 37 may detect the tap operation on the operation element 10 from the left side or the right side in a state where an interval G from a lane marking B (the lane marking between the lane L1 and the lane L2 (an example of a second travel path) adjacent to the lane L1) to the vehicle 2 is less than a prescribed reference interval. In such a case, the travel control unit 12 changes lanes (travel paths of the vehicle 2) from the lane L1 to the lane L2 adjacent thereto. Accordingly, it is possible to reflect an intention of the occupant X in the vehicle control while suppressing the travel position of the vehicle 2 from being changed to a position just near the lane marking B. In another embodiment, the travel control unit 12 may not change lanes (travel paths of the vehicle 2) and keep the travel position of the vehicle 2 at the base position SP in the above case. In this embodiment, the interface control unit 41 may notify the occupant X that the travel position of the vehicle 2 cannot be changed because the interval G is less than the prescribed reference interval by using a user interface such as the display 40.

In the present embodiment, the lane L1 delimited by the lane marking B is used as an example of the travel path of the vehicle 2. On the other hand, in another embodiment, a road or the like which is not delimited by the lane marking B may be used as an example of the travel path of the vehicle 2.

Concrete embodiments of the present invention have been described in the foregoing, but the present invention should not be limited by the foregoing embodiments and various modifications and alterations are possible within the scope of the present invention.

The invention claimed is:

1. A vehicle control system for a vehicle in which steering control is executable, comprising:
   an operation element configured to receive a driving operation by an occupant;
   a contact sensor configured to detect a contact operation on the operation element from either a first side or a second side in a vehicle width direction; and
   a travel control unit configured to change a travel position of the vehicle in the vehicle width direction within a lane where the vehicle is traveling if the contact sensor detects the contact operation in a state where the steering control is executable,
   wherein the travel control unit is configured to change lanes of the vehicle from a first lane where the vehicle is traveling to a second lane adjacent to the first lane if the contact sensor detects the contact operation and a spatial interval from a lane marking between the first lane and the second lane to the vehicle is less than a prescribed reference interval.

2. The vehicle control system according to claim 1, further comprising a travel position setting unit configured to set a base position within the lane where the vehicle is traveling, a first offset position offset from the base position to the first side in the vehicle width direction within the lane where the vehicle is traveling, and a second offset position offset from the base position to the second side in the vehicle width direction within the lane where the vehicle is traveling,
   wherein the travel control unit is configured to change the travel position of the vehicle in the vehicle width direction from the base position to the first offset position or the second offset position if the contact sensor detects the contact operation in a state where the vehicle is traveling in the base position.

3. The vehicle control system according to claim 2, wherein the travel position setting unit is configured to increase offset widths from the base position to the first offset position and the second offset position as a width of the lane where the vehicle is traveling increases.

4. The vehicle control system according to claim 2, wherein the travel control unit is configured to return the travel position of the vehicle in the vehicle width direction from the first offset position or the second offset position to the base position if the vehicle passes through a prescribed spot in a state where the vehicle is traveling in the first offset position or the second offset position.

5. The vehicle control system according to claim 1, wherein the travel control unit is configured to change the travel position of the vehicle in the vehicle width direction within the lane where the vehicle is traveling and to decelerate the vehicle if the contact sensor detects the contact operation and a width of the lane where the vehicle is traveling is less than a prescribed reference width.

6. The vehicle control system according to claim 1, wherein the travel control unit is configured to change the travel position of the vehicle in the vehicle width direction within the lane where the vehicle is traveling and to decelerate the vehicle if the contact sensor detects the contact operation and a space outside the lane satisfies a prescribed deceleration condition.

7. The vehicle control system according to claim 1, wherein the travel control unit is configured to change the travel position of the vehicle in the vehicle width direction to the second side in the vehicle width direction within the lane where the vehicle is traveling if the contact sensor detects the contact operation on the operation element from the first side in the vehicle width direction, and
   the travel control unit is configured to change the travel position of the vehicle in the vehicle width direction to the first side in the vehicle width direction within the lane where the vehicle is traveling if the contact sensor detects the contact operation on the operation element from the second side in the vehicle width direction.

8. The vehicle control system according to claim 1, wherein the operation element includes a hub provided rotatably, a disk provided coaxially on an outer circumference of the hub, and a ring provided on an outer circumference of the disk, and
   the contact sensor is configured to detect the contact operation by a capacitive sensor provided on an outer circumferential part of the ring.

9. The vehicle control system according to claim 1, further comprising a moving device configured to move the operation element in the vehicle width direction and a vehicle length direction with respect to a vehicle body,
   wherein the operation element is movable among a first position located on the first side in the vehicle width direction, a second position located on the second side in the vehicle width direction, and a third position located between the first position and the second position in the vehicle width direction and located more forward than the first position and the second position in the vehicle length direction.

* * * * *